Dec. 29, 1942.   L. F. EXLEY   2,306,431
CONVEYING APPARATUS
Filed March 22, 1940   5 Sheets-Sheet 1

Inventor
LEO F. EXLEY

Dec. 29, 1942.  L. F. EXLEY  2,306,431
CONVEYING APPARATUS
Filed March 22, 1940   5 Sheets-Sheet 2

Inventor
LEO F. EXLEY

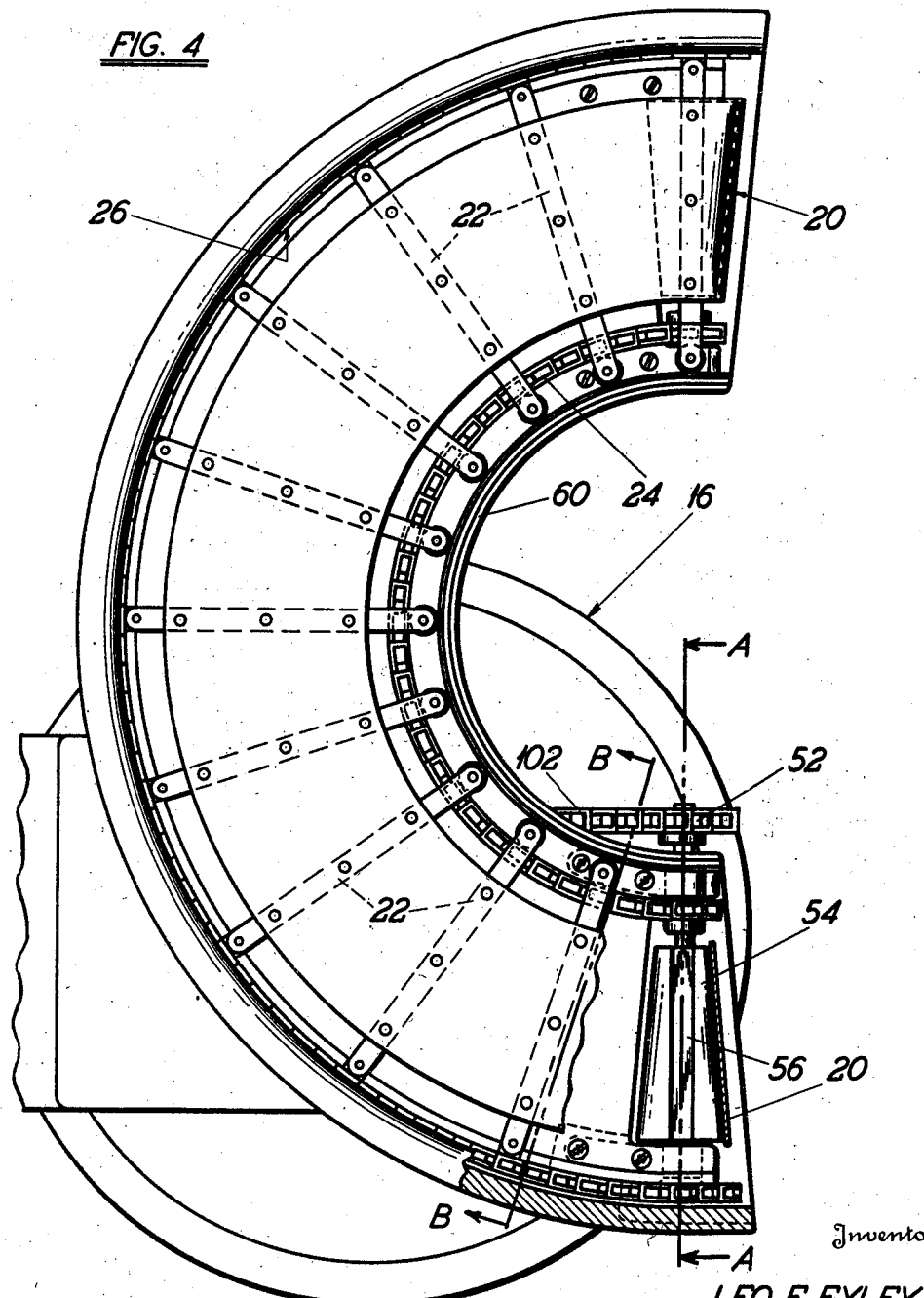

Dec. 29, 1942.  L. F. EXLEY  2,306,431
CONVEYING APPARATUS
Filed March 22, 1940   5 Sheets-Sheet 4

Inventor
LEO F. EXLEY
By Charles L. Randall
Philip S. Hopkins
Attorneys

Dec. 29, 1942.   L. F. EXLEY   2,306,431
CONVEYING APPARATUS
Filed March 22, 1940   5 Sheets-Sheet 5
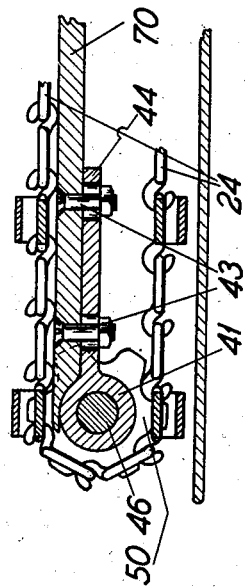
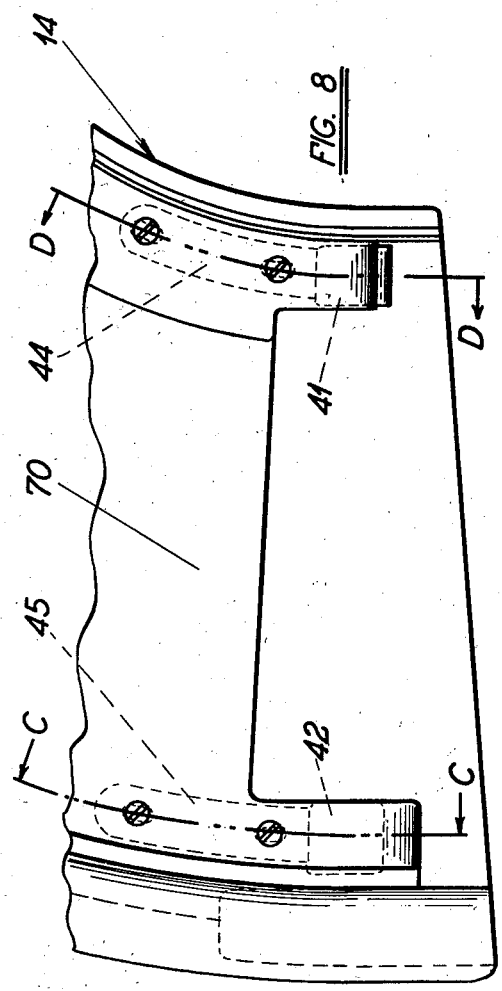
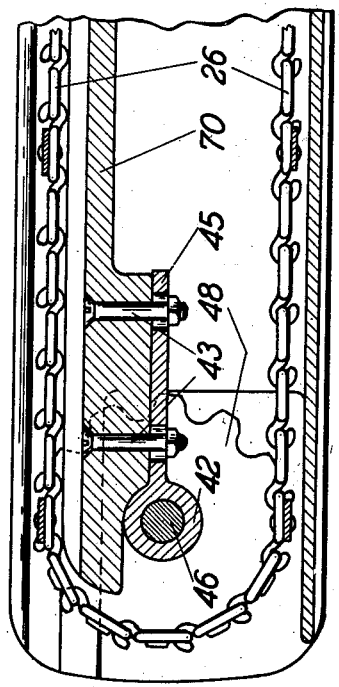
Inventor
LEO F. EXLEY Patented Dec. 29, 1942

2,306,431

UNITED STATES PATENT OFFICE 2,306,431

CONVEYING APPARATUS

Leo F. Exley, Johnson City, N. Y., assignor to Endicott Johnson Corporation, a corporation of New York Application March 22, 1940, Serial No. 325,437

8 Claims. (Cl. 198—182)

The present invention relates to conveying and stacking apparatus for the handling of blank parts which are discharged at regular intervals from a processing machine, after which they are to be stacked or arranged in close order.

It is the principal object of this invention to provide apparatus of this nature which will make it possible for a single operator to feed an automatic machine on one side and to have the parts which have been operated upon by that machine returned to him adjacent the feeding station in an orderly manner and partially collected, so that the same operator may both feed and stack. One of the useful fields for this invention is the conveying and stacking of sheet-like blanks of all kinds in shoe factories.

The practice hitherto has been to have one operator feed the processing machine and another operator to inspect and assemble in stacked relation the discharged articles or blanks. With the novel apparatus to be disclosed herein, the discharged articles may be returned mechanically to a position where they are convenient to the feeding operator. The stacking device which forms a part of the novel combination serves to minimize the effort and attention required by the operator to put the processed blanks in finally stacked condition for boxing or otherwise. In essence, the apparatus of this invention comprises approximately semicircular endless conveying means which preferably traverse an arc of something over 180 degrees, a cradle-shaped stacking device which forms a continuation of the conveying means and is curved in longitudinal profile so as to arrange a series of overlapping blanks in approximately face-to-face relation, and a combined drive and support for the conveying means which permits it quickly to be swung in a generally horizontal plane to a position affording complete access to the processing machine with which it is used. Another important feature of this invention is the head or housing which encircles the conveying means and cooperates therewith to produce smooth and efficient operation throughout a full return bend.

The stacking device described illustratively herein is provided with parallel bars having a low coefficient of friction in order to facilitate the handling of blanks or objects which are rough or tacky in nature. Adjustable means are provided for regulating the operating position or inclination of the stacking device.

Other details and features of the invention, including the construction and combination of its various parts, will be described in connection with an illustrative embodiment and pointed out in the appended claims.

Reference is now made to the accompanying drawings, in which

Fig. 4 is an enlarged top plan view of the conveying apparatus;

Fig. 8 is a fragmentary plan view showing the nature of the bearing means for the conveying apparatus;

Fig. 9 is a detailed section taken on the line C—C of Fig. 8 with the driving chains for the conveyor in place; and Fig. 10 is a detailed section on the line D—D of Fig. 8 also illustrating further the driving chains for the conveyor.

Figure 1:
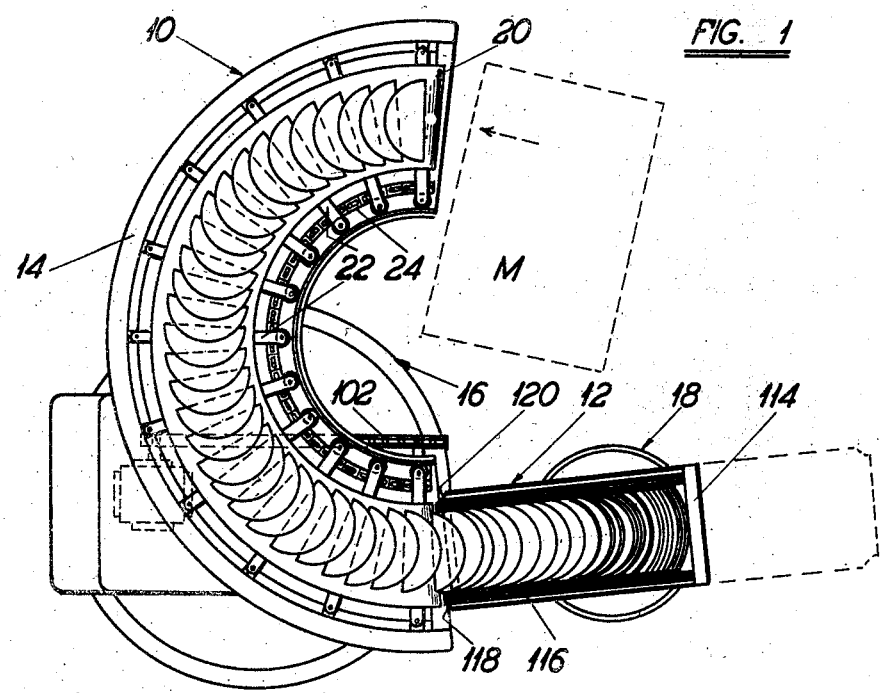
Fig. 1 is a top plan view of the conveying and stacking apparatus in cooperative relation to a processing machine.

A semicircular conveying means 10 of endless or continuous type providing spaced upper and lower runs has associated with one of its ends a stacking device indicated generally as 12 which receives a series of blanks b, b delivered thereto by the conveying means 10. In Fig. 1 there is indicated diagrammatically an automatic machine M for operating on or processing said blanks b and discharging them to the end of the conveying means which is remote from the stacking device 12. A head or housing 14 encircles the conveying means 10 and is pivotally supported by a pedestal 16 adjacent the stacking device 12. It will be noted also that a standard 18 supports the stacking device 12 so as to form a continuation of the conveying means 10 at its delivery end.

While the conveying means has been designated generally as 10, attention is now called to Figs. 1 and 4, in which it is seen to comprise an endless conveyor belt 20 of any suitable material, rubberized fabric in this instance, and a continuous series of uniformly spaced cross members or bars 22 which are spaced with respect thereto as shown in said Fig. 4, and preferably formed from a metal which is sufficiently rigid and tough. A continuous inner chain 24 and a similar outer chain 26 extend in parallel, spaced relation to the respective edges defining the upper and lower runs of the belt 20. By means such as rivets 28, the cross members 22 are secured to the under or inner side of the belt 20 in radial positions which have a common center on the axis of the conveying means 10. The inner chain 24 is provided with circumferentially spaced inwardly extending lugs 30 and the outer chain 26 with similarly extending lugs 32 for connection with the cross members 22. A guide roller 34 is mounted on the inner end of each cross bar 22 and turns on a vertical pin 36 which serves also to connect the said cross bar 32 with its respective chain lug link 30. On the other hand, the outer end of each cross bar 22 is more simply joined to an outer chain lug link 30 through the medium of a rivet 38, the inner and outer ends of the cross bar 22 in each instance being on top of the lug links. Obviously, the chains 24 and 26 are constructed to accommodate the curvature in plan of the belt 20.

Figure 6:
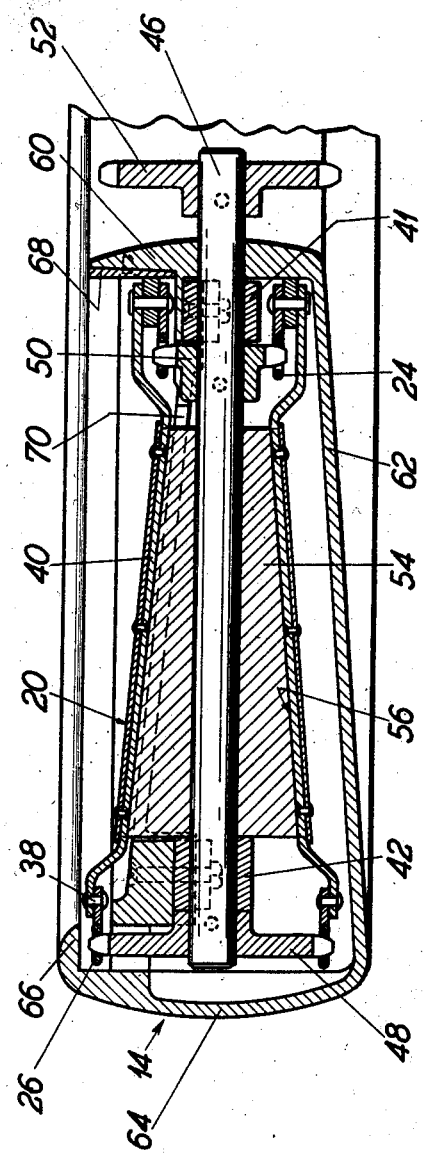
Fig. 6 is a detailed cross-section taken on line A—A of Fig. 4.

As shown best in the enlarged section of Fig. 6, each cross member or bar 22 is formed with a flat inwardly depressed portion 40 for purposes which are to be described. The relation of these depressed portions 40 to the chain sprockets is a very important one because it insures the smooth operation of the very unusual form of semicircular conveyor embodying this invention.

At the end adjacent pedestal 16, the working head 14 for the conveying means (as seen in Figs. 8, 9 and 10) is provided with a suitable, aligned pair of journal bearings 41 and 42 adjustably secured at its inner and outer portions by means such as bolts 43, 43 passing through inwardly extending circular lugs 44 and 45, respectively. The bearings 41 and 42 support a drive shaft 46 which extends horizontally and rotates a large outer sprocket 48 and small inner sprocket 50 with their conveyor chains 26 and 24, respectively. It is to be observed that the inner end of the drive shaft 46 extends through the working head or housing 14 and carries externally of said housing a driving sprocket 52.

When the longitudinal axis of a transverse section of the conveyor belt 20 is made to coincide with a line connecting the pitch diameters of the large outer chain sprocket 48 and the small inner chain sprocket 50 at each end of the conveyor, the transition or turn at the end points can be made without distortion, binding, or slipping of the belt 20. To produce this highly desirable result, the surface or depressed portion 40 of each cross member 22 which underlies and supports the belt 20 is made parallel to the described downwardly and inwardly inclined line which connects the sprocket pitch diameters and is carefully positioned to support said belt 20 in the essential position which has been stated.

In order to insure the proper spacing of the cross members 22 at all times, the drive shaft 46 carries intermediate its bearings a frusto-conical guide pulley 54, the lateral surface taper of which corresponds to that defined by a vertically aligned pair of cross bars 22, with this exception: diametrically opposed recesses 56, 56 are provided in the outer surface of the frusto-conical guide pulley 54 of such a depth and shape as may be necessary completely to receive said cross members as they make an end turn. The size of the frusto-conical guide pulley 54 is such a one as will maintain the longitudinal center line of the conveyor belt 20 section in the specified position and prevent stress and strain.

Except for a shaft 46 which terminates within the working head 14, the endless conveyor chain sprockets 48 and 50, bearings 41, 42, and frusto-conical guide pulley 54 at the receiving end of the conveying means 10 correspond in details with those of the rotatable means which have been described for the pedestal or delivery end.

Attention will next be given to the detailed nature of the working head or conveyor housing 14, as illustrated by Fig. 6. As has been explained, the head 14, which may be a casting of relatively light metal such as aluminum or suitably fabricated otherwise into an integral structure, is semicircular with a circular inner side wall 60, a bottom wall 62, and an outer side wall 64, also circular. Note is made of an inwardly extending flange 66 which overhangs the outer conveyor chain 26 to prevent the same from riding upwardly due to the resultant of forces acting upon a conveyor of this peculiar shape. The rollers 34 serve to guide the inner ends of the cross members 22 and to receive the preponderance of thrust in a radial direction. It has been found desirable to employ a replaceable wear strip 68 on the upper portion of the inner face of the side wall 60 for the excessive wearing action in that area. A continuous guide surface 70, which may be an integral part of the housing 14, extends around the said housing in a position which supports the conveyor belt 20 and cross members 22 in their upper run, that is to say, the surface inclines downwardly and inwardly with respect to the working head 14 and at the same inclination as the depressed portions 40 and the upper element of the guide pulley 54. The ends of the guide surface 70 are positioned to receive the belt 20 after it leaves the guide pulleys and yet to provide suitable clearance for the latter. In this manner, the working head 14 snugly encloses the lower run and side edges of the conveyor belt 10 and its driving chains 24, 26.

Figure 2:
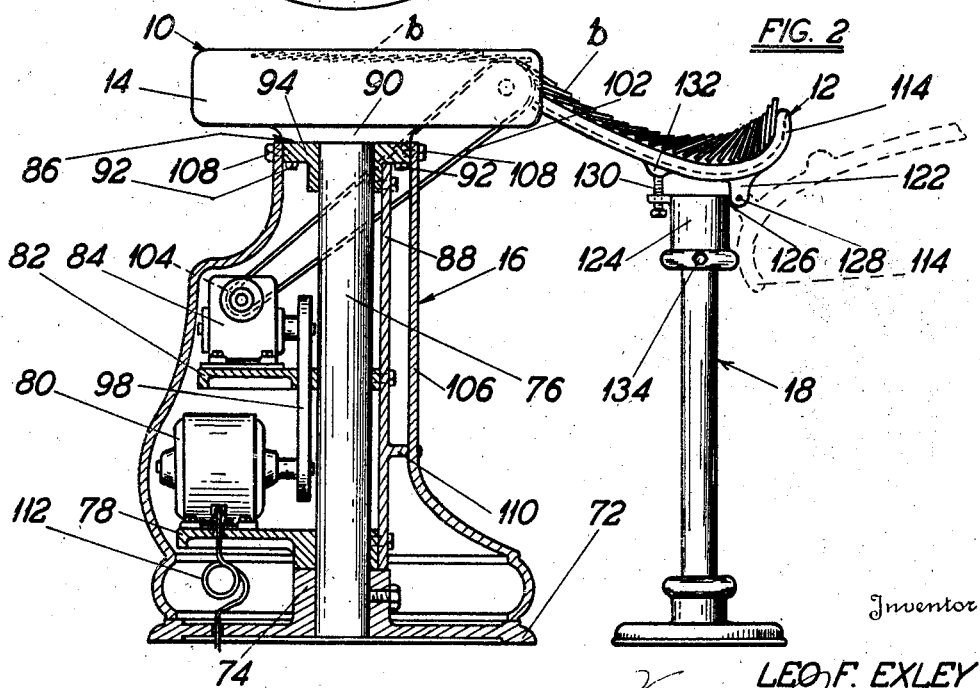
Fig. 2 is a front elevation of the apparatus shown in Fig. 1 having certain parts of the supporting means in section.
Figure 5:
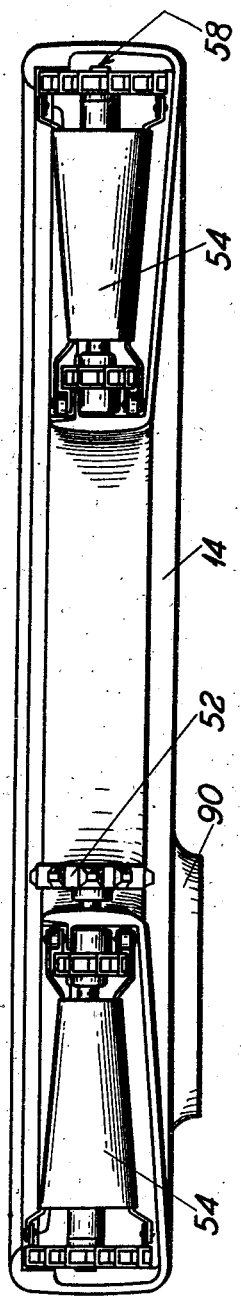
Fig. 5 is a side elevation looking towards the ends of the conveying means and its housing.

The pedestal 16, which pivotally supports the working head 14 as a cantilever and lies wholly below the upper run of the conveyor belt 20, comprises a novel arrangement of elements which will now be considered more fully. A base 72 of sufficient circumference to give stability rests upon the floor and is formed with an upwardly extending socket or boss 74 at its center. The socket 74 receives a vertical shaft 76 around which turns a shelf or bracket support 78 for an electric motor 80 of suitable type and capacity, an upper support 82 for a standard form of speed reducer 84, and a top flange member 86 which will be further referred to herein. A tie bar 88 is bolted or otherwise detachably secured to the motor support 78, the speed reducer support 82, and the top flange member 86 adjacent their respective hubs so as to maintain them in fixed and spaced relation for rotation about the vertical shaft 76. Figs. 2 and 5 serve to indicate a circular boss 90 on the bottom of working head 14 somewhat inwardly of its stacking device end. A spaced series of cap screws 92 extend upwardly through an enlarged portion or flange 94 of the top member 86 and secure the latter member to the head 14.

Figure 3:
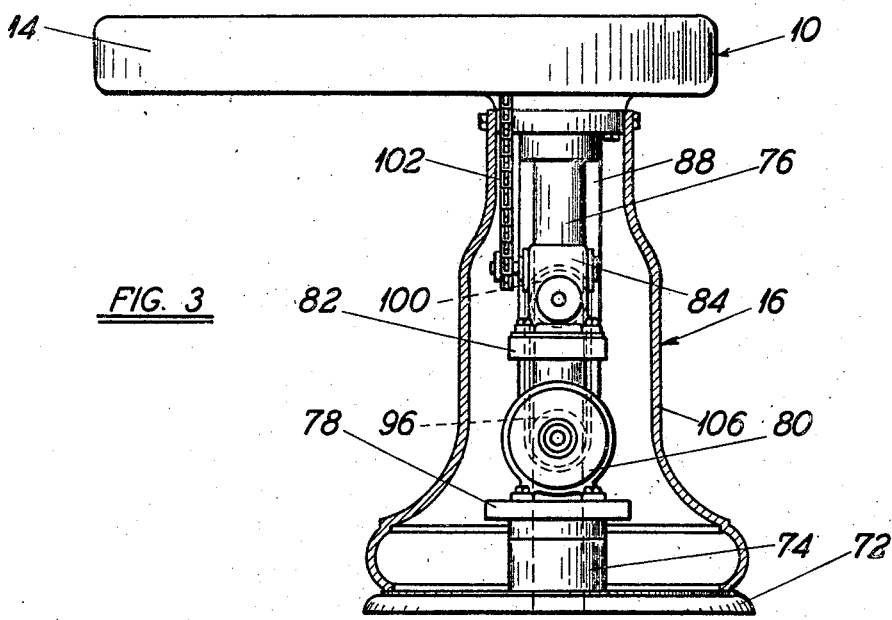
Fig. 3 is an end elevation of the conveying apparatus alone with the supporting means therefor shown in vertical section.
Figure 7:
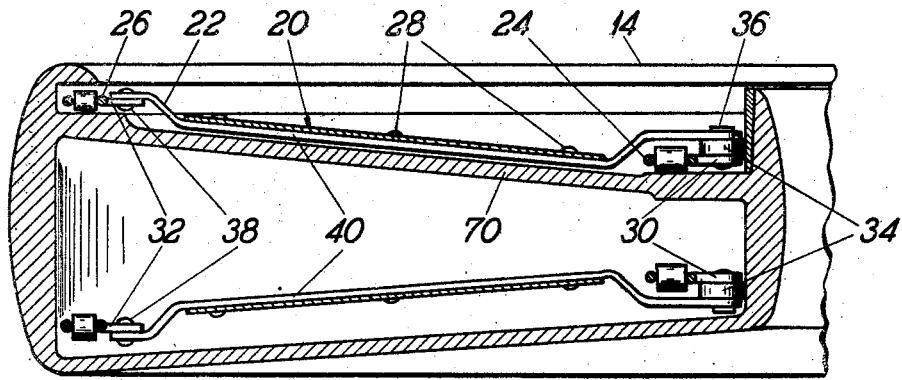
Fig. 7 is an additional detailed cross-section on the line B—B of Fig. 4.

Referring to Figs. 2 and 3, it will be seen that the motor 80 has a pulley 96 mounted on its inner end adjacent the vertical pedestal shaft 76 and that a belt 98 connects that pulley to an aligned one 100 on the input shaft of the speed reducer 84, the belt 98 passing through the speed reducer support 82, as shown. A driving chain 102 connects the conveyor sprocket 52 with an output sprocket 104 of the speed reducer 84 and extends in a plane which is perpendicular to that of the motor belt 100.

A close fitting outer casing 106 in two parts encloses the motor 80 and speed reducer 84, and is in turn sustained by horizontally extending cap screws 108 which engage the periphery of the enlarged flange portion 94 of the member 86. The tie bar 88 for the rotating members carries an outwardly projecting element 110 which extends through the casing 106 to aid its rotation. The upper end of the shaft 76 supports the working head boss 90 and the other rotating parts which are connected to the top flange member 86, which it will be recalled is arranged to rotate around said shaft 76, in such a manner as to provide necessary clearance between the bottom of the pdestal 108 and the top base 72. It should be further mentioned that the casing 106 is suitably slotted to permit passage of the drive chain 102, and that the latter moves in a direction which will drive the upper run of conveyor belt 20 toward the stacking device 12. With the mounting and arrangement of drive parts which has been described, the working head 14 and the power drive for the conveying means 10 may be readily pivoted or swung horizontally about the base 72 and away from the machine M with which it is normally associated. Sufficient flexibility for this purpose is afforded by a flexible electrical connection or pigtail 112 passes through base 72 to the electric motor 80.

In its details, the stacking device 12 comprises a cradle-shaped member having a longitudinal profile which closely resembles an exponential curve, departing therefrom in its sharply curved lower end 114 which is nearly vertical. Where the blanks b possess such physical characteristics that they do not slide easily, it has been found advantageous to form the upper surface of the stacking device 12 with a series of spaced parallel bars 116 extending longitudinally from end to end. These bars 116 are preferably metal which is highly polished to reduce its coefficient of friction on the upper surface which engages and supports the blanks at spaced points. To provide clearance for adjacent portions of the conveying means 10 and thus permit the stacking device to form a practically uninterrupted continuation of the belt 20, the inner corners of the stacking device 12 have been notched at 118 and 120 respectively in the manner illustrated in Fig. 1.

A downwardly extending pair of parallel lugs 122 (only one of which is shown) is provided near the outer end 114 of the stacking device 12. The standard 18 for this device carries a rotatable socket 124 on its upper end, which socket is provided with a corresponding pair of lugs 126 (only one being shown) pivotally connected to the stacking device lugs 122 by means such as pin 128. On its opposite or inner side, the rotatable socket 124 is formed to receive a pair of vertically extending screws 130 arranged to engage a pair of similarly spaced bosses 132 on the bottom of the stacking device 12 and inwardly of the pivot mounting. When the socket 124 is in a position properly to align the stacking device 12 with the working head 14 of the conveying apparatus, it may be retained in that position against movement in a horizontal plane by a set screw 134. The dotted line showing of the stacking device 12 in Fig. 1 serves to illustrate how readily it may be swung away from the working head 14 in a vertical plane to permit swinging movement of the latter on its pedestal 16. The adjusting means or screws 130 are convenient for regulating the downward inclination of the stacking device in accordance with the specific nature of the blanks to be handled.

Certain other novel aspects of this invention will be brought out in connection with the following summary of its operation. The operator will first adjust the linear speed of the conveyor belt 20 in accordance with the rate of output of the machine with which it is to be used and the physical dimensions of the blanks being operated upon, for example, according to size and outline if the usual variety of shoe parts comprising toe blanks, counters, sole members and the like are to be processed. It will be quite obvious that endless, flexible conveyors or belts of other familiar types, such as foraminous, cleated, or receptacle may be used where the work requires. With the adjusting means which have been provided for the stacking device 12, this member also may be set to operate with maximum efficiency over a range of sizes, shapes, and materials. As the blanks b, b are delivered at a constant rate from the machine M to the conveyor belt 20, it will be possible and often desirable to operate the latter at a speed which will produce the overlapping relationship or pattern which has been illustrated. When these blanks b, b are discharged to the stacking device 12, they will slide downwardly until they engage the vertical lower end 114 which will rearrange them into practically a face-to-back stack for quick removal. While traversing around the conveying means 10 and initially along the stacking device 12, the processed blanks b will be within the vision of the operator for inspection and rejection of any defective items.

It will be recognized that the successful operation of a half-turn conveyor of the endless belt type which has been described herein depends upon the outlined arrangement of the conveyor belt 20 with respect to the sprockets, 48, 50, which drive endless chains, 24, 26, the novel form of cross members 22 which hold the conveyor belt to a relatively fixed path, and the frusto-conical guide pulleys 54 with their cooperating recesses 56 for said cross members. The satisfactory operation of such a conveyor is achieved by the arrangement and combination of parts which have been specified and also the guiding and restraining action provided by the working head 14. Moreover, the utility of the conveying means 10 and its cooperating stacking device 12 is materially increased by the manner in which they are supported for movement out of and into working relation with respect to the processing machine and each other without disconnecting any parts.

Having thus described my invention, what I claim as novel and desire to secure by Letters Patent of the United States is:

1. In a return bend conveying apparatus, a continuous, flexible conveyor member arranged to provide semi-circular upper and lower runs; an inner conveyor chain for the corresponding edge of the conveyor member; an outer conveyor chain for the opposite edge of said conveyor member; a pair of sprockets at each end of the conveyor member and over which the chains run, said pairs of sprockets being of unequal size with the larger ones engaging the outer conveyor chain and the smaller ones the inner conveyor chain; and cross member means arranged to secure the flexible conveyor member to the respective chains and being depressed so that the transverse, longitudinal center line of said conveyer member coincides substantially with a line joining the pitch diameters of the sprockets at opposite points of chain engagement.

2. A conveying apparatus comprising an endless belt having substantially semicircular upper and lower runs; a continuous drive chain at the inner edges of said belt; a continuous drive chain at the outer edges of said belt, two pairs of unequal size sprockets for supporting and driving said chains at the ends of the belt, the larger sprocket of each pair engaging the chain adjacent the outer belt edges; housing means for the endless belt, said housing including a continuous surface which extends between the two pairs of sprockets and is formed and arranged to support the entire underface of the upper run of the belt; cross members secured to the belt at spaced intervals and connected at their ends to the respective chains, the cross members being depressed intermediate their ends to support the belt so that the longitudinal center line of a transverse section will coincide with a line connecting corresponding parts of the sprockets of a pair; and a frusto-conical guide pulley for each end of the belt and coaxial with the respective pairs of sprockets.

3. A conveying apparatus comprising an endless belt having a spaced pair of substantially semicircular runs; a continuous drive chain at the inner edges of said belt; a continuous drive chain at the outer edges of said belt; two pairs of unequal size sprockets for supporting and driving said chains at the end of the belt, the larger sprocket of each pair engaging the chain adjacent the outer belt edges; cross members secured to the belt at spaced intervals and connected at their ends to the respective chains, the cross members being depressed intermediate their ends to support the belt so that the longitudinal center line of a transverse section will coincide with a line connecting corresponding parts of the sprockets of a pair; and a frusto-conical guide pulley for each end of the belt and coaxial with the respective pairs of sprockets.

4. A conveying apparatus comprising an endless belt having substantially semicircular upper and lower runs; a continuous drive chain at the inner edges of said belt; a continuous drive chain at the outer edges of said belt; two pairs of unequal size sprockets for supporting and driving said chains at the ends of the belt, the larger sprocket of each pair engaging the chain adjacent the outer belt edges; cross members secured to the belt at spaced intervals and connected at their ends to the respective chains, the cross members being depressed intermediate their ends to support the belt so that the longitudinal center line of a transverse section will coincide with a line connecting corresponding parts of the sprockets of a pair; and a frusto-conical guide pulley for each end of the belt and coaxial with the respective pairs of sprockets, said guide pulleys being recessed for engagement with the cross members.

5. A return bend conveying apparatus which comprises in combination, an endless conveyor belt having upper and lower runs of semicircular shape; an inwardly tapered frusto-conical guide pulley within each end of the belt; uniformly spaced cross members secured to the inner side of the belt in radial fashion throughout its length and projecting beyond the edges thereof; continuous driving chains at the inner and outer circumferential edges of the belt and connected to the adjacent ends of the cross members; a pair of large and small driving chain sprockets coaxial with and at opposite ends of each conical guide pulley, the sprockets and cross members being shaped and arranged to support the belt in planes coincident with elements of the conical guide pulleys; a horizontal roller rotatably carried by the inner end of each cross member; and a housing of semicircular outline arranged to cover the lower run and side edges of the conveyor belt, said housing having an inwardly extending flange at its outer upper edge disposed to prevent appreciable upward movement of the outer drive chain or the outer ends of the cross members and an inner side wall of circular shape to receive the radial thrust of the belt and guide the cross member rollers.

6. A return bend conveying apparatus which comprises in combination, an endless conveyor belt having upper and lower runs of semicircular shape; an inwardly tapered frusto-conical guide pulley within each end of the belt; uniformly spaced cross members secured to the inner side of the belt in radial fashion throughout its length and projecting beyond the edges thereof, said guide pulleys having longitudinal recesses formed and arranged to receive portions of the cross members; continuous driving chains at the inner and outer circumferential edges of the belt and connected to the adjacent ends of the cross members; a pair of large and small driving chain sprockets coaxial with and at opposite ends of each conical guide pulley, the sprockets and cross members being shaped and arranged to support the belt in planes coincident with elements of the conical guide pulleys; a horizontal roller rotatably carried by the inner end of each cross member; and an integral working head of semicircular outline arranged to cover only the lower run and side edges of the conveyor belt, said working head having an inwardly extending flange at its outer upper edge disposed to prevent appreciable upward movement of the outer drive chain or the outer ends of the cross members and an inner side wall of circular shape to receive the radial thrust of the belt and guide the cross member rollers.

7. In combination, a semicircular conveyor member of the endless belt type with one run above the other; a semicircular housing surrounding said conveyor member; frusto-conical rotatable means at each end of the housing tapering toward the center thereof and around which the conveyor member is passed, said housing including a continuous surface which extends between the frusto-conical rotatable means at each end and is formed and arranged to support the entire underface of the upper run of the conveyor member between the frusto-conical rotatable means and at the same inclination as said frusto-conical rotatable means; and a pedestal pivotally connected in supporting relation to the housing adjacent one end only, said pedestal being disposed below the upper run of the conveyor member to provide unobstructed access to both ends thereof.

8. In combination, a semicircular conveyor member of the endless belt type with one run above the other; a semicircular housing surrounding said conveyor member; frusto-conical rotatable means at each end of the housing tapering toward the center thereof and around which the conveyor member is passed, said housing including a continuous surface which extends between the frusto-conical rotatable means at each end and is formed and arranged to support the entire underface of the upper run of the conveyor member between the frusto-conical rotatable means and at the same inclination as said frusto-conical rotatable means; and means pivotally supporting the housing adjacent one end.

LEO F. EXLEY.